F. H. HARDENBERGH.

Scroll-Saws.

No. 134,882.            Patented Jan. 14, 1873.

Witnesses:

Inventor:
F. H. Hardenbergh
PER
Attorneys.

UNITED STATES PATENT OFFICE.

FRANK H. HARDENBERGH, OF HAWLEY, PENNSYLVANIA.

IMPROVEMENT IN SCROLL-SAWS.

Specification forming part of Letters Patent No. 134,882, dated January 14, 1873.

*To all whom it may concern:*

Figure 1:
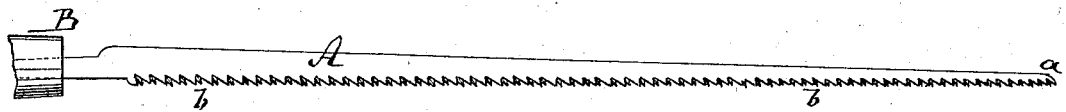
Figure 2:
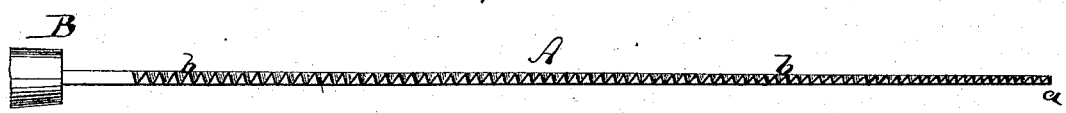
Figure 3:

Be it known that I, FRANK H. HARDENBERGH, of Hawley, in the county of Wayne, and State of Pennsylvania, have invented a new and Improved Scroll-Saw, of which the following is a specification:

Figure 1 is a side view, Fig. 2 an edge view, and Fig. 3 a transverse section on an enlarged scale, of my improved scroll-saw.

Similar letters of reference indicate corresponding parts.

The invention relates to a new construction of saw-blade for use in scroll-sawing and other fine work; and consists in filing a double set of teeth on the cutting-edge of the saw by a series of oblique incisions in opposite directions, whereby the saw is made more effective than others for its purpose, and whereby it can be sharpened on an ordinary grindstone by reducing its thickness in the same way as other (*i. e.*, edge) tools are sharpened.

In the accompanying drawing, the letter A represents my improved saw-blade. It is attached to a suitable handle or other device, B, of suitable size. It is made to taper toward the back, as shown in Fig. 3, so that its cutting-edge is thicker than its back. It is also made to taper toward the point *a*, as shown in Fig. 1, all of which tapering allows it to be freely moved within wood when once it is placed through the same for cross-cutting or very fine work. The saw-teeth *b b* are formed on the saw by a series of oblique incisions arranged alternately in opposite directions, which produce two rows of teeth side by side, as indicated in Figs. 2 and 3. These teeth project furthest from the saw-blade at the edges or sides of the same, and form at such sides cutting-points which, when worn blunt, can be resharpened by grinding the saw at the sides on a grind or emery stone, and thereby removing the blunt parts of the teeth.

The expensive processes of upsetting the saw-teeth and gumming the same will by this means be, to a very great extent, or entirely, dispensed with.

Having thus described my invention, I claim as new and desire to secure by Letters Patent—

A saw-blade having two rows of teeth, *b b*, formed on it by oblique incisions longitudinally in opposite directions, as described and shown.

FRANK H. HARDENBERGH.

Witnesses:
    ARTHUR O'HARA,
    E. RICHARDSON.